United States Patent [19]

Pawelzik et al.

[11] Patent Number: 4,971,113
[45] Date of Patent: Nov. 20, 1990

[54] SINGLE-LEVER MIXING-VALVE ASSEMBLY

[75] Inventors: Manfred Pawelzik, Soest; Horst Titze, Hagen, both of Fed. Rep. of Germany

[73] Assignee: Friedrich Grohe Armaturenfabrik GmbH & Co., Hemer, Fed. Rep. of Germany

[21] Appl. No.: 467,856

[22] Filed: Jan. 22, 1990

[30] Foreign Application Priority Data

Feb. 10, 1989 [DE] Fed. Rep. of Germany ....... 3903997

[51] Int. Cl.⁵ .......................................... F16K 11/078
[52] U.S. Cl. .............................. 137/625.17; 137/454.2; 137/625.4
[58] Field of Search .............. 137/454.2, 625.17, 625.4

[56] References Cited

U.S. PATENT DOCUMENTS

| | | | |
|---|---|---|---|
| 3,951,169 | 4/1976 | Loose | 137/454.2 X |
| 4,325,403 | 4/1982 | Uhlmann | 137/625.17 X |
| 4,610,268 | 9/1986 | Knapp | 137/625.17 X |
| 4,676,270 | 6/1987 | Knapp et al. | 137/625.17 X |
| 4,682,626 | 7/1987 | Bergmann | 137/625.4 X |
| 4,754,783 | 7/1988 | Knapp | 137/625.4 |

FOREIGN PATENT DOCUMENTS

| | | |
|---|---|---|
| 3137774 | 3/1983 | Fed. Rep. of Germany . |
| 3211618 | 10/1983 | Fed. Rep. of Germany ... 137/625.4 |
| 3510835 | 10/1988 | Fed. Rep. of Germany . |

OTHER PUBLICATIONS

International Publication No. WO86/07431 Published 18 Dec. 1986.

Primary Examiner—Gerald A. Michalsky
Attorney, Agent, or Firm—Herbert Dubno; Andrew Wilford

[57] ABSTRACT

A mixing-valve assembly has a hollow housing, a valve plate in the housing formed with hot- and cold-water inlet ports and an outlet port, a control plate slidable on the valve plate and formed with a mixing cavity alignable with the ports, and a lever assembly pivoted on the control plate for sliding the control plate on the valve plate and thereby bringing the cavity into registration with the ports for water flow therebetween. An adapter disk fitted in the housing is formed with a recessed seat in which the valve plate is snugly engaged and with respective passages communicating with the valve-plate ports. The adapter disk is secured in the housing to fix the valve plate therein.

6 Claims, 4 Drawing Sheets

SINGLE-LEVER MIXING-VALVE ASSEMBLY

FIELD OF THE INVENTION

The present invention relates to a single-lever mixing valve. More particularly this invention concerns an adapter assembly for holding the cartridge of such a valve.

BACKGROUND OF THE INVENTION

As described in German patent document No. 3,137,774 filed 23 Sept. 1981 by W. P. Herring and in German patent document No. 3,510,835 filed 26 Mar. 1985 by J. Humpert and M. Pawelzic, a single-control mixing valve has a valve plate formed with hot-and cold-water inlet ports and a mixed-water outlet port, and a control plate slidable on this valve plate and formed with a mixing cavity that can be aligned with the ports to allow flow from the inlet ports to the outlet port. The valve plate can be moved back and forth to vary the volume of flow from the inlet ports and from side to side to vary the temperature of the water at the outlet port.

The valve and control plates are normally incorporated in a valve cartridge that is a replaceable part of a valve assembly that has a housing that covers the plates, a base plate that underlies the valve plate and that is formed with passages that connect downward to incoming and outgoing water lines and that mate upward with the ports in the valve plate, and a pivot assembly that in turn carries the operating lever. For replacement of the cartridge, the housing and lever are lifted off, the old cartridge is removed, the new cartridge is fitted in place, and the housing and lever are remounted over the new cartridge.

The housing is typically dimensioned with an eye toward style and economic construction while the cartridge is a standardized unit that does not vary over a wide range of different single-lever faucets. This creates a problem of fitting the various valve housings with the standard cartridge, something substantially complicated by the different diameters and heights of these housings.

OBJECTS OF THE INVENTION

It is therefore an object of the present invention to provide an improved single-lever mixing-valve fitting.

Another object is the provision of such an improved single-lever mixing-valve fitting which overcomes the above-given disadvantages, that is where a standard and relatively small cartridge can be mounted in a whole line of valve housings of different diameters and heights.

SUMMARY OF THE INVENTION

A mixing-valve assembly according to this invention has a hollow housing, a valve plate in the housing formed with hot-and cold-water inlet ports and an outlet port, a control plate slidable on the valve plate and formed with a mixing cavity alignable with the ports, and lever assembly pivoted on the control plate for sliding the control plate on the valve plate and thereby bringing the cavity into registration with the ports for water flow therebetween. According to this invention an adapter disk fitted in the housing is formed with a recessed seat in which the valve plate is snugly engaged and with respective passages communicating with the valve-plate ports. The adapter disk is secured in the housing to fix the valve plate therein.

The system of this invention makes it relatively simple to swap out a worn-out cartridge against a new one, even when the newer model is of somewhat different diameter or overall height than the old one. The diameter of the seat recess in the adapter plate makes up for the different cartridge size, and the thickness of the adapter plate at this seat accommodates the new height. The lever assembly can be reinstalled and will be at the right position relative to the faucet housing, which completely hides the replacement cartridge. The adapter disk can typically be screwed into the bottom of the faucet housing to ensure a watertight fit with the underlying valve base plate. In fact the adapter disk can be used in an assembly where the cartridge has a separate base plate carrying the valve plate, or one where there is only a valve plate.

According to another feature of this invention the housing includes a base plate having an upper surface and formed with feed passages communicating with the adapter-disk passages and the adapter disk has a lower face sitting on the base-plate upper surface. Respective seal rings surround the passages at the surfaces. In addition a base plate underlying and engaging the valve plate is formed with inlet and outlet passages communicating between the respective ports of the valve plate and the respective passages of the adapter disk. A cartridge sleeve is fixed to and extends upward from the base plate around the valve and control plates and the lever assembly is pivoted about two perpendicular axes on the cartridge sleeve. Centering pins project between the base plate and the adapter disk. These centering pins project from the base plate into the adapter disk and can be provided with snap-fit barbs positively but releasably engageable with the adapter disk. To this end the pins are tubular and are formed with longitudinal splits defining the snap-fit barbs and the adapter plate is formed with holes complementary to the pins and formed with recesses into which the barbs can engage laterally.

DESCRIPTION OF THE DRAWING

The above and other objects, features, and advantages will become more readily apparent from the following, reference being made to the accompanying drawing in which.

SPECIFIC DESCRIPTION

Figure 1:
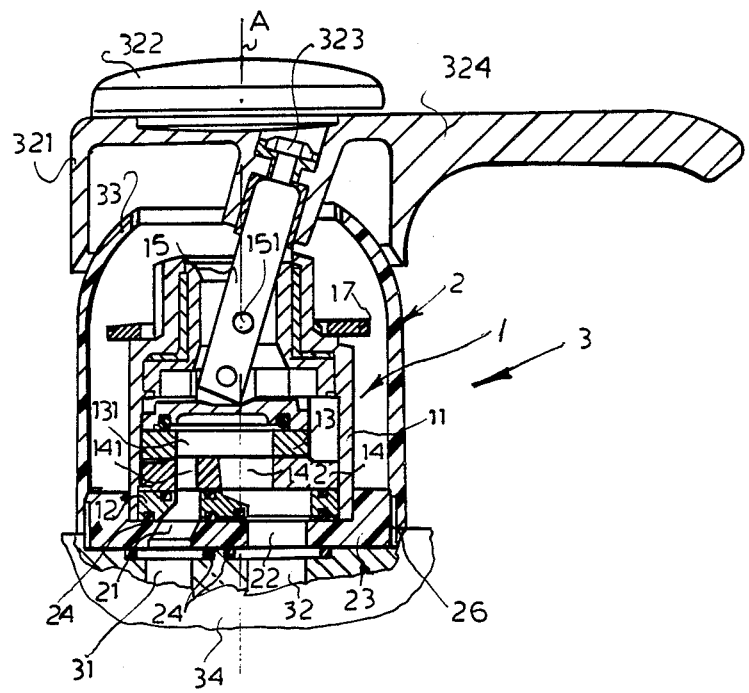
FIG. 1 is a vertical section through the mixing-valve faucet according to this invention.
Figure 2:
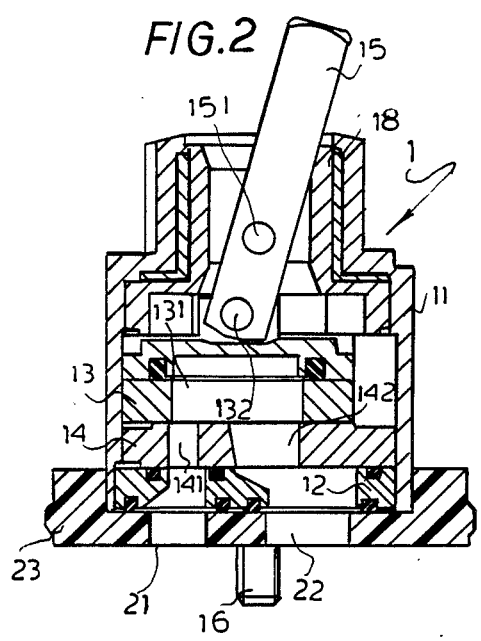
FIG. 2 is a larger-scale view of the inner works of the faucet assembly of FIG. 1.
Figure 3:
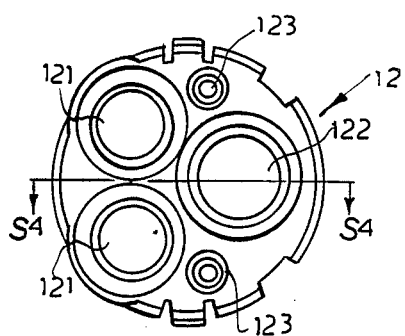
FIG. 3 is a bottom view of the valve plate of the assembly.
Figure 4:
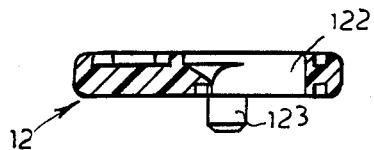
FIG. 4 is a section taken along line S4—S4 of FIG. 3.
Figure 5:
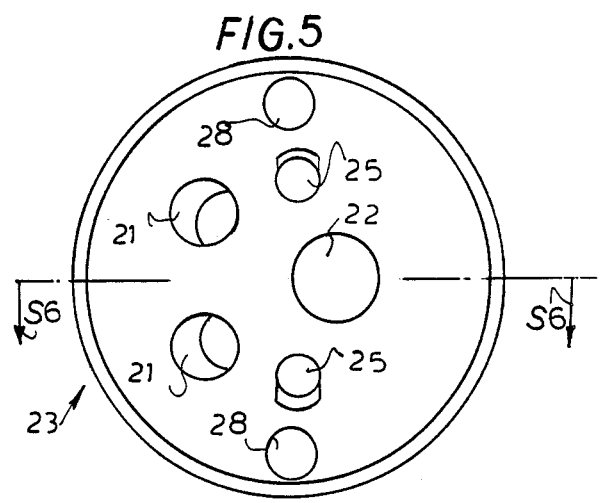
FIG. 5 is a bottom view of the adapter disk of the assembly.

As seen in FIGS. 1 and 2 a mixing-valve faucet assembly 3 according to this invention has a housing 2 in which is provided a cartridge 1. As is standard, the cartridge 1 can be replaced when it wears out.

The basic faucet assembly 3 comprises a base plate 34 formed with hot- and cold-water inlet passages 31 and with a tempered-water outlet passage 32, the former to one side of a central upright axis A of the assembly 3 and the latter to the other side. Unillustrated pressurized supply pipes are connected to the passages 31 and another conduit leads from the passage 32 to the unillustrated faucet of the assembly.

Figure 6:
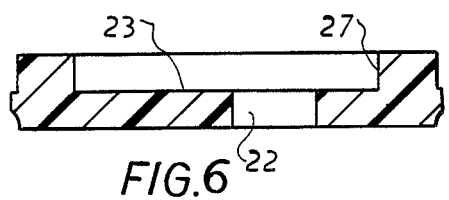
FIG. 6 is a section taken along line S6—S6 of FIG. 5.
Figure 7:
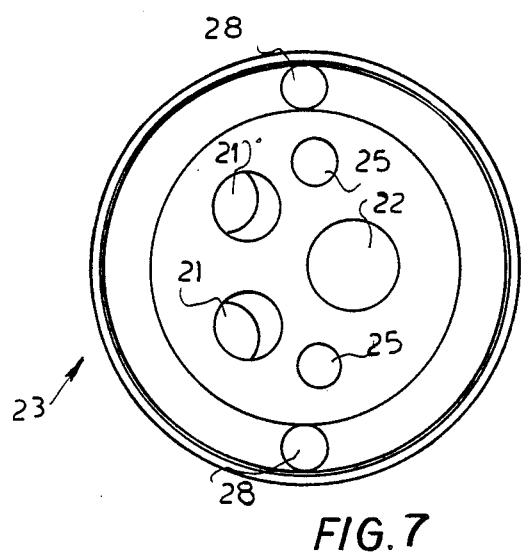
FIG. 7 is a top view of adapter disk of FIG. 5.
Figure 8:
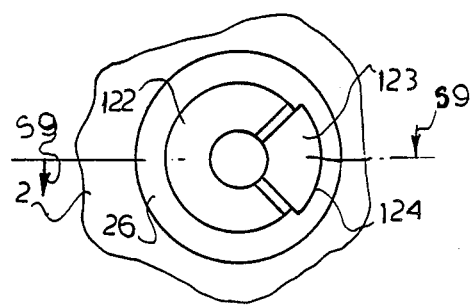
FIG. 8 is a large-scale bottom view of a detail of an alternative of the system of this invention.
Figure 9:
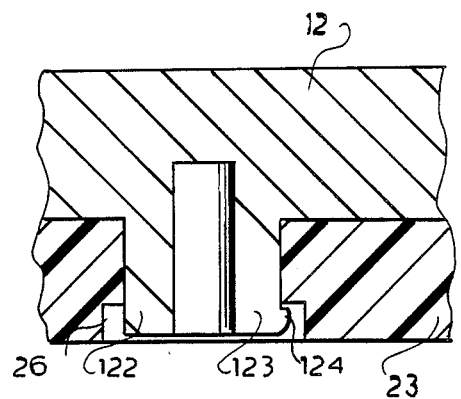
FIG. 9 is a section taken along line S9—S9 of FIG. 8.

The housing 2 basically comprises an adapter disk 23 secured by screwthreads 26 in the lower end of a basically cylindrical housing sleeve 33 whose upper end is part spherical. The adapter disk 23 is formed with a pair of inlet passages 21 communicating with the passages 31 and with an outlet passage 22 communicating with the passage 32. O-ring seals 24 are fitted in the upper surface of the base plate 34 around the passages 21;31 and 22;32. In addition this adapter disk 23 is formed with a pair of throughgoing holes 28 for mounting means described below and with a cylindrical seat 27 (FIG. 6) for the cartridge 1.

According to this invention the cartridge 1 has a housing comprised of a sleeve 11 in whose lower end is fixed a base plate 12. This base plate 12 is formed with passages 121 and 122 aligned with the passages 21 and 22 of the adapter disk 23. Sitting atop this plate 13 is a stationary valve plate 14 in turn having passages 141 and 142 communicating with the passages 121 and 122 and sitting atop this plate 14 is a two-part control plate 13 formed with a cross-flow cavity 131. Both the plates 13 and 14 are of a hard ceramic material and their confronting faces are perfectly planar and very finely machined so that the plate 13 can slide easily on the plate 14. To this end a lever 15 is pivoted at 151 at the center of curvature of the rounded top of the housing sleeve 33 in a sleeve 18 that can rotate about the axis A in the cartridge 1 and also is pivoted at 132 o the top of the plate 13. In addition this lever 15 carries an arm 324 with a cylindrical skirt 321 that extends down around the housing sleeve. Thus tipping this lever arm 324 about the axis 151 in the plane of the view of FIGS. 1 and 2 will move the plate 13 back and forth to vary the overlap of the cavity 131 and the passages 141 and 142 to vary the amount of flow from the former to the latter. Pivoting of the lever arm 324 and the sleeve 18 will bring the cavity 131 over one of the passages 141 more than the other and vary the temperature of the water fed to the outlets 142, 122, 22.

The base plate 12 of the cartridge 1 is formed with a pair of roughly diametrally opposite studs or pins 123 that project downward axially into respective complementary holes in the plate 23 to establish the correct angular position of the cartridge 1 in the cylindrical seat 27 of the adapter ring 23. In addition a pair of bolts 16 have heads bearing at diametrally opposite locations on a washer 17 sitting atop a shoulder of the cartridge sleeve 11 and are threaded into the base plate 34 of the faucet 3 to secure the cartridge 1 solidly in place thereon.

To change the cartridge 1 a cap 322 is snapped off the lever 324 and a screw 323 is removed to allow the lever 324 to be taken off. Then the housing sleeve 33 is unthreaded upward and the two screws 16 are removed. The cartridge 1 and adapter disk 23 can then be removed. If the new cartridge 1 is of a different diameter or height, a new adapter disk 23 whose seat 27 is of the appropriate diameter and which is of the necessary thickness at the seat 27 is then installed in the faucet 3 in the reverse order.

We claim:

1. A mixing-valve assembly comprising: a hollow housing;
    a cartridge in the housing and including
    a cartridge sleeve,
    a valve plate fixed in the sleeve and formed with hot- and cold-water inlet ports and an outlet port,
    a control plate slidable in the sleeve on the valve plate and formed with a mixing cavity alignable with the valve-plate ports, and
means including a lever assembly pivoted on the control plate for sliding the control plate on the valve plate and thereby bringing the cavity into registration with the valve-plate ports for water flow therebetween;
    a one-piece adapter disk having an outer periphery fitted in the housing underneath the cartridge and formed centrally with a recessed seat in which the valve plate and cartridge sleeve are snugly engaged and with respective passages communicating with the valve-plate ports;
    a base plate on which the adapter disk sits, the base plate being formed with feed passages communicating with the adapter-disk passages; and
    means engaged between the cartridge and the base plate for securing the adapter disk and the cartridge in the housing against the base plate.

2. The mixing-valve assembly defined in claim 1 wherein the base plate has an upper surface and the adapter disk has a lower face sitting on the base-plate upper surface, the assembly further comprising respective seal rings surrounding the passages at the surfaces.

3. The mixing-valve assembly defined in claim 1, further comprising
    centering pins projecting between the base plate and the adapter disk.

4. The mixing-valve assembly defined in claim 3 wherein the centering pins project from the base plate into the adapter disk.

5. The mixing-valve assembly defined in claim 4 wherein the pins are provided with snap-fit barbs positively but releasably engageable with the adapter disk.

6. The mixing-valve assembly defined in claim 5 wherein the pins are tubular and are formed with longitudinal splits defining the snap-fit barbs, the adapter plate being formed with holes complementary to the pins and formed with recesses into which the barbs can engage laterally.

* * * * *